Sept. 5, 1933. V. DAHLMAN 1,925,793
AIR FILTER
Filed May 25, 1931 3 Sheets-Sheet 1
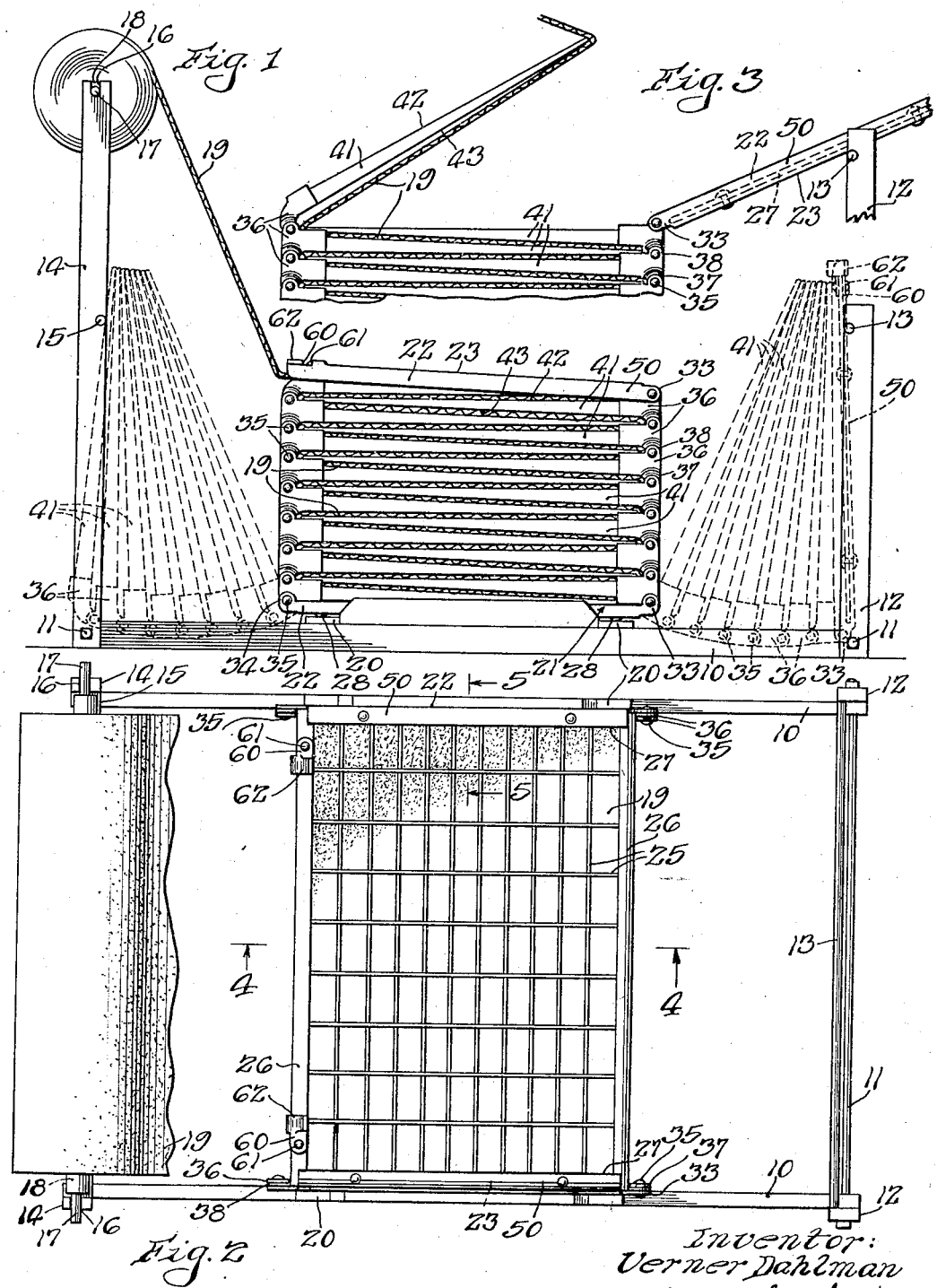

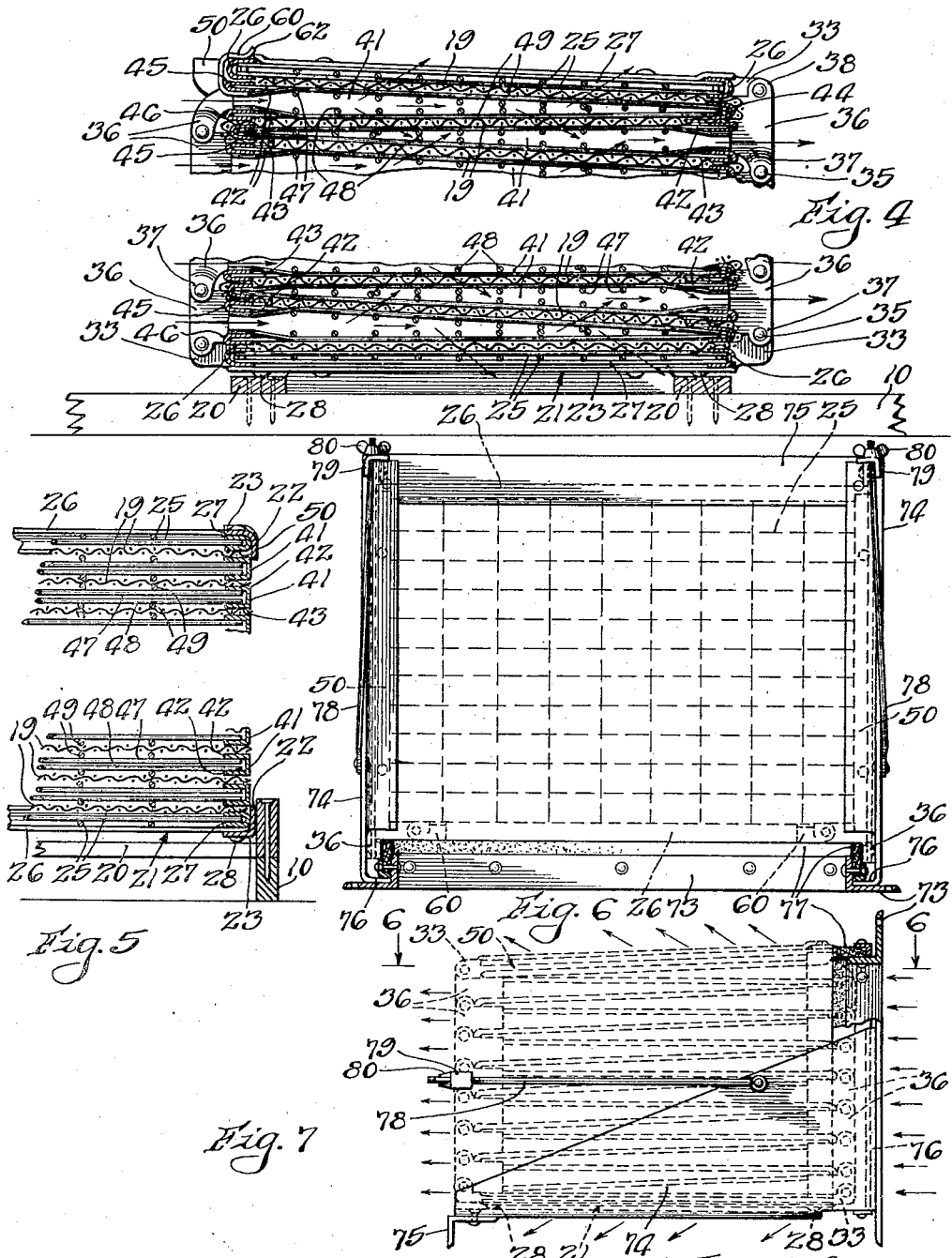

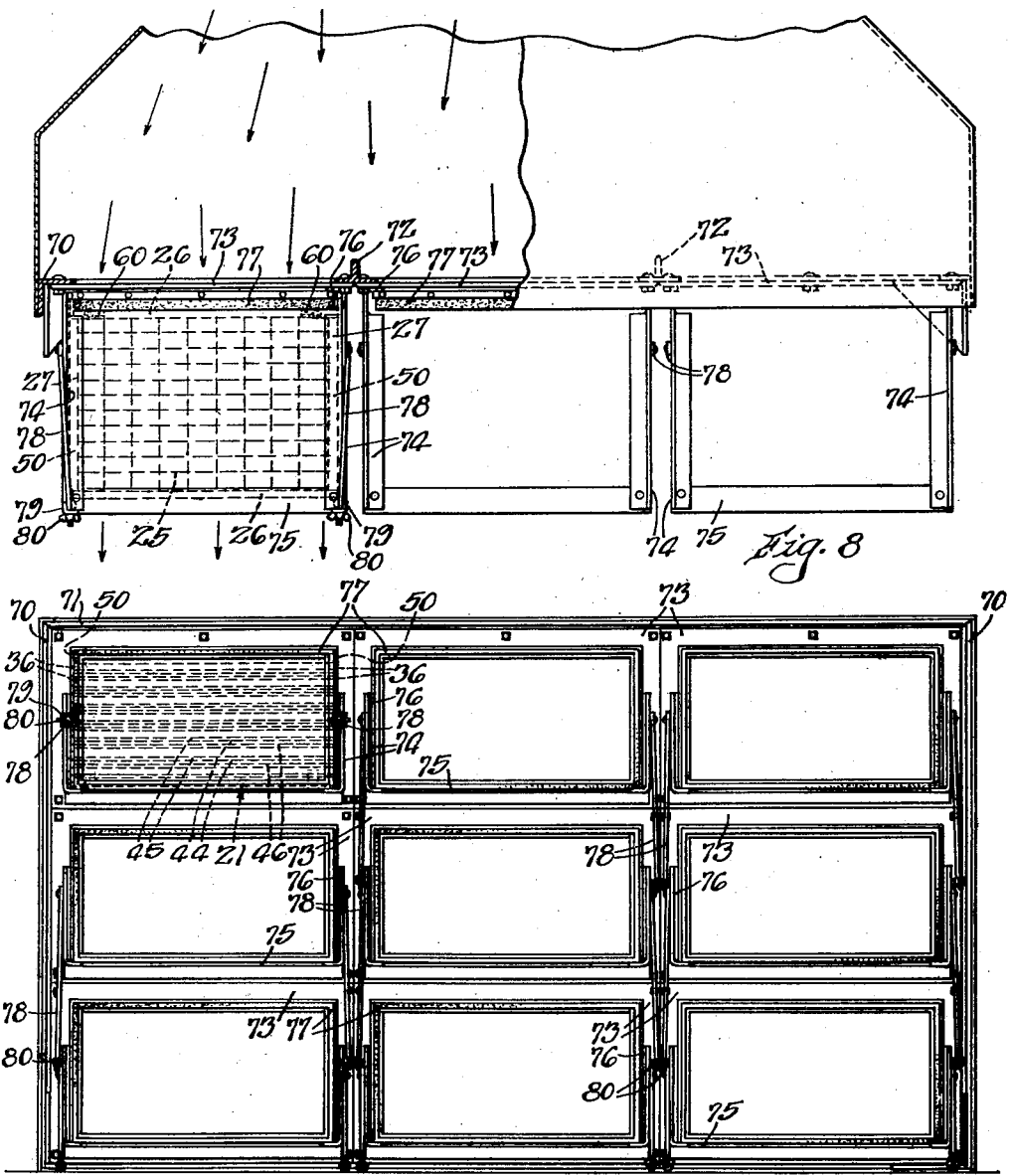

Patented Sept. 5, 1933

1,925,793

UNITED STATES PATENT OFFICE 1,925,793

AIR FILTER

Verner Dahlman, New Lenox, Ill., assignor to Independent Air Filter Company, Chicago, Ill., a corporation of Illinois Application May 25, 1931. Serial No. 539,852

11 Claims. (Cl. 183—71)

The present invention relates to air filters, and has to do particularly with that kind of filter in which air is forced or drawn through a dry medium, the major portion of which comprises surfaces substantially parallel to the direction of flow of the air to and from the filter.

It is an established fact that the filtration of air is highly beneficial. The problem heretofore has been to develop an effective but at the same time an inexpensive filter. To provide a filter with a sheet medium of large area through which the air may pass and yet maintain the filter containing such medium within a small compass has been attempted by many but apparently has reached its acme only in the present apparatus.

The objects of the invention include the provision of an unique filter having an extraordinarily large area of exposed filter surface, or capacity, for its cubic content.

A second object of the invention is the provision of a new and novel filter structure.

A further object of the invention is an unique means for combining a plurality of spacing elements adapted to be used in an air filter as well as in other devices.

A still further object of the invention is the provision of a new and novel spacer for an air filter or the like.

These objects, and such other objects as may hereinafter appear, are obtained by the novel construction, unique arrangement and improved combination of the several elements which constitute the single form of the invention shown in the accompanying drawings, in which:

Figure 1 is a side elevation of a filter unit disposed upon a frame provided for the ready discharge of used filter material and the reloading of the unit with fresh material;

Figure 2 is a top view of the filter and frame shown in Figure 1;

Figure 3 is a detail in end elevation showing a filter when its initial opening operation has been had, Figure 1 heretofore described illustrating in dotted lines the complete open position of such filter;

Figure 4 is a fragmentary transverse section taken on the line 4—4 of Figure 2, looking in the direction of the arrows;

Figure 5 is a detail in fragmentary longitudinal section taken on the line 5—5 of Figure 2;

Figure 6 is a transverse section on the line 6—6 of Figure 7;

Figure 7 is a detail, in end elevation, partly in section and partly broken away, showing the details of construction for the attachment of a filter unit upon a shelf provided therefor;

Figure 8 is a longitudinal section through a filter installation in which a plurality of units are employed, the figure illustrating the manner in which each of the filters is secured to a supporting shelf; and Figure 9 is a detail in elevation taken from the back of a filter installation comprising a plurality of filter units arranged in an air duct.

Like reference characters are used to designate similar parts in the drawings and in the description of the invention hereinafter given.

Reference should be had first to Figures 1 and 2. These not only illustrate one of the filter units comprising in itself a complete filter, but they also illustrate the manner in which such a unit may be conveniently loaded and unloaded.

For purposes of loading and unloading, there is provided for use with a unit, a frame comprising a pair of horizontal members 10 suitably joined transversely by members 11, the under surfaces of members 11 being in a horizontal plane with the bottom surfaces of members 10.

Projecting upwardly from said base member 10 at the right hand side of Figures 1 and 2 are end standards 12 joined together by a cross member 13 which maintains the standards 12 in spaced relation and also serves as a rest for certain of the filter spacers or laminæ.

At the other end of said frame, the left hand side of Figures 1 and 2, is a higher pair of standards 14 which are joined together by a cross member 15 like member 13 and serving the same purpose. The member 15 is intermediate the length of standards 14 instead of the top thereof. The legs 14 extend to a higher vertical plane and at their tops are cut away to provide sockets or bearings 16 for a transverse shaft 17 having an enlarged section 18 upon which a roll of filter material 19 is disposed. The frame just described and illustrated provides a means for supporting a roll of filter paper, filter cloth or other filter material in strip form permitting of such material being conveniently and readily unrolled therefrom as required.

Cross members 20 may be provided upon the frame members 10 to support a filter unit and may be positioned so that lugs extending downwardly from a filter unit may rest thereupon. Each filter unit comprises a base member 21 which may have lugs or legs 22 to raise it slightly from a shelf or support in or upon which it is used. Said base member 21 may comprise strips of material extending from the front to the back of said filter unit at each end thereof. Each strip has two sections, a vertical section 22 and a horizontal section 23; the latter forming the bottom of the filter unit.

Intermediate said strip 21 and secured to section 23 by spot welding or otherwise is a screen 25 comprising longitudinal and transverse wire members generally having a greater separation in one direction than in the other and providing a support for filter material 19 when used within the unit. On top of screen 25 are strips 26 which may be riveted as well as spot welded to members 21. Said strips secure the screen firmly upon the bottom member.

Other strips 27 extend longitudinally of said unit and are joined to members 21. Each comprises a U-shaped member with two sections articulated to provide the legs of the U, the open end receiving the strands of screen 25. Each member 27 in addition to being welded to screen 25 is welded or riveted to the members 21 and strips 26. Each member 27 may have lugs 28, as previously indicated, to rest on transverse members 20.

At each end of said member 21, there is disposed what may be called a hinge member 33. Said hinge member 33 has an extension 34 at its top. In said extension is an aperture into which a connecting means 35 is disposed whereby the connecting means becomes a pivot for a spacer above the base member. Upon said base member 21, two spacer elements are pivoted. Each spacer member has a hinge member 36 with two extensions 37 and 38. The extension 37 is offset to permit of joinder between hinges 36 and 33 with the faces of the extensions therein in contact. The connecting means 35 extend through the extension portions somewhat removed from their peripheries and in juxtaposition with an imaginary line defining the limit of the body of the hinge member.

The body of the hinge member 36 is secured to the side 41 of the spacer, the upper portion of the hinged member 36 and the upper extension 38 projecting thereabove for reasons shortly to be obvious.

The lower extension 37 and aperture of the body of the hinge member 36 extend below the lowermost margin of the spacer member. To an upper extension on a spacer is secured the lower extension of the next spacer thereabove, the extension of the lower member projecting upwardly in a straight line, the lower section of each upper hinge member being made parallel thereto by the offsetting of said lower extension.

Similar hinge members and fastening members are at each end of and are used on each of the intermediate spacer members at their deep sides. The hinge members differ only with respect to those used upon the bottom members 21 and with respect to the top and next to the top spacer members, there being no use for an upper extension upon the topmost spacers, and it is therefore omitted.

Each spacer member comprises a wedge shaped side member 41. Such wedge shaped member is usually of sheet metal and has a section thereof upwardly turned to provide flanges 42 and 43. The sides of the spacer converge as its free end is approached.

The material of the flanges 42 and 43 is adapted to be spot welded or crimped upon an articulated member 44 extending transversely of the device.

At the captive end of each spacer, opposed flanges 42 and 43 are connected by an articulated member 45 and 46, such members being like the member 44.

Screens 47 and 48, like screen 25, are disposed to rest against the two flanges 42 and 43. The articulated member 44 is attached to both of screens 47 and 48 while the edges of said screens 47 and 48 are covered at the deep end of the spacer member by the members 45 and 46, respectively.

Between the members 45 and 46 there may be spacing wires 49, two or more in number, which extend from one articulated member 45 to the other articulated member 46. These wires may be crimped or welded upon said members 45 and 46 just as they are in respect to screen members 47 and 48. With respect to the flanges 42 and 43, spot welding is employed to attach the screens thereto.

The next to the top spacer member is like the other spacer members except that it has no top extension. It may be rounded off at its top side for convenience.

The top member of the filter unit comprises angle iron ends 50 and differs from the lowermost member only in that it is attached to one spacer element and in that the angle irons are reversed. The lower or base member has spacer members secured at both sides. The top member comprises two angle irons 50 secured to the topmost extension of one of the hinges on the second from topmost spacer, there being a screen secured thereon in the same way as the screens in the base section. At each edge of the screen, the wire ends are covered in the same manner as in the base section to prevent the ends of the wire from projecting.

For holding the spacer elements in contact, a fastening means or locking means between the topmost and next adjacent spacer is provided. This may be in the form of a U-shaped clasp 60 pivoted at 61 in the topmost element and having a free end 62 to resiliently grip the top surface of the top member 50. By rotating said member on its pivot 61 the section 62 may be disengaged from the top member 50, permitting of the lifting of member 50 in the manner shown in Figure 3.

The next adjacent and topmost spacer element is then lifted upwardly and outwardly in the manner shown in Figure 3, the movement being in a direction opposite to the movement of top member 50.

The next lower spacer is then moved outwardly in the same manner as the top member 50. Following this movement, the next spacer element is moved to the left, in respect to Figure 3. This relation of the spacers, one by one, in clockwise and counterclockwise rotation, is continued until the last is lifted from the base, when any filter material 19 in the device may be removed.

New filter material is inserted upon the screen 25 and stretched thereacross, the end being positioned so that the proper spacer element above said base may be laid over the filter material 19 recumbent on screen 25. When the spacer element is positioned, filter material is laid upon its upper surface, after which the next spacer element is laid thereover.

Similar manipulations are continued until the filter is completely filled with material 19 when the required amount of material 19 is cut from the roll thereof. Fastener 60 is then secured in place and the unit is ready for use in the crypt or niche provided therefor.

A typical filter installation is illustrated in Figures 6, 7, 8 and 9.

In the latter two figures, there is shown a frame work of vertical angle irons 70. Therebetween are horizontal members 71. Members 70 and 71 define an area to be traversed by air currents and the position for the filter units for purifying the air in such currents. Other vertical members 72 may be disposed between the members 70. A plurality of rectangular open frames 73 are provided. Members 73 may be bolted to or otherwise secured to members 70 and 72.

Each frame 73 has a triangular member 74 suitably attached thereto. At their rear, members 74 are joined by a cross member 75. At the front and top such rectangular frame has a transverse member 76. Suitable packing 77 may be disposed about the opening in frame 73 to engage the filter unit when seated in members 74 to provide an air-tight seal between the frame and filter unit.

Upon each triangular member 74 is a pivoted rod 78. At the end thereof is an L-shaped gripping piece 79 one leg of which is apertured to ride on the threaded rod 78. A wing nut 80 is movable along the threads on rod 78 to draw the gripping piece against a corner of a filter unit to force it into close engagement with the rectangular frame 73 and the packing 77 thereon arranged to be engaged by the unit. The weight of the filter unit is upon the triangular brackets 74. Such unit may be readily attached thereon by the affixing means just described, and removed with equal facility by releasing the gripping means.

The filter unit is not provided with an enclosing pocket as is quite conventional but is disposed with its six walls generally open. Air of course can only flow through the filter paper, entering at one side and passing out the opposite side. The present arrangement is of few parts, is inexpensive to build, is easy to load and unload, simple to maintain, possesses high capacity, and is remarkably efficient. Because of its immense area of exposed filter surface, the velocity of air through the filter may be very low while the capacity is great.

This application covers a device similar to that disclosed in applicant's earlier filed application for Letters Patent, Serial Number 505,700, entitled Air filter, and filed December 31, 1930.

I claim:

1. A filter unit having a filter medium in strip form arranged in zigzag layers and comprising a base, and spacer elements of V-shape in transverse section hingedly connected to opposed sides of said base.

2. A filter unit having a filter medium in strip form arranged in zigzag layers and comprising a base, and spacer elements at opposed sides of said base, the spacer elements at each side comprising a series permanently joined one to another for movement, relative to said base and also for relative movement between the spacer elements of each series.

3. A filter unit having a filter medium in strip form arranged in zigzag layers and comprising a base, and spacer elements at opposed sides of said base, the spacer elements at each side comprising a series permanently joined one to another for relative movement, the lowermost spacer being joined to said base.

4. A filter unit comprising V-shaped spacer elements pivotally connected to one another at their broader ends and interlaced at their narrower ends.

5. A filter unit comprising series of interlaced V-shaped spacer elements, and connecting means therebetween admitting of angular movement between said spacer elements.

6. A filter unit comprising series of interlaced V-shaped spacer elements, and connecting means therebetween admitting of relative angular movement between said spacer elements and said connecting means.

7. A filter unit comprising a base, spacer elements at opposed sides thereof and connected to said base for angular movement, the connecting means between associated elements providing permanent connection and admitting of angular movement therebetween.

8. A filter unit comprising a base, spacer elements at opposed sides thereof and connected to said base for angular movement, the spacer elements at each side constituting a series of elements, the connecting means between said associated spacer elements of a series providing permanent connection and admitting of angular movement therebetween, and locking means for securing opposed spacer elements in an interlaced arrangement with the spacers of one series intermediate the spacer elements of the other series.

9. A support for a filter comprising uprights to receive one vertical face of said filter, and brackets depending from said uprights to engage the bottom thereof, said brackets being at the ends of said filter and leaving said bottom, the top, back, and a large portion of the area of said ends open to the atmosphere.

10. A support for a filter unit comprising uprights against which said filter unit is disposed, and triangular brackets extending therefrom a depth equal to the depth of said unit and to receive the bottom of said unit.

11. Means for supporting an air filter in operable position comprising paired uprights against which said filter is disposed, brackets depending therefrom a distance equal to the depth of said filter and having sections for supporting said filter at the side and outside edges of its bottom, and means on said brackets engaging said filter to secure it on said supporting sections.

VERNER DAHLMAN.